UNITED STATES PATENT OFFICE.

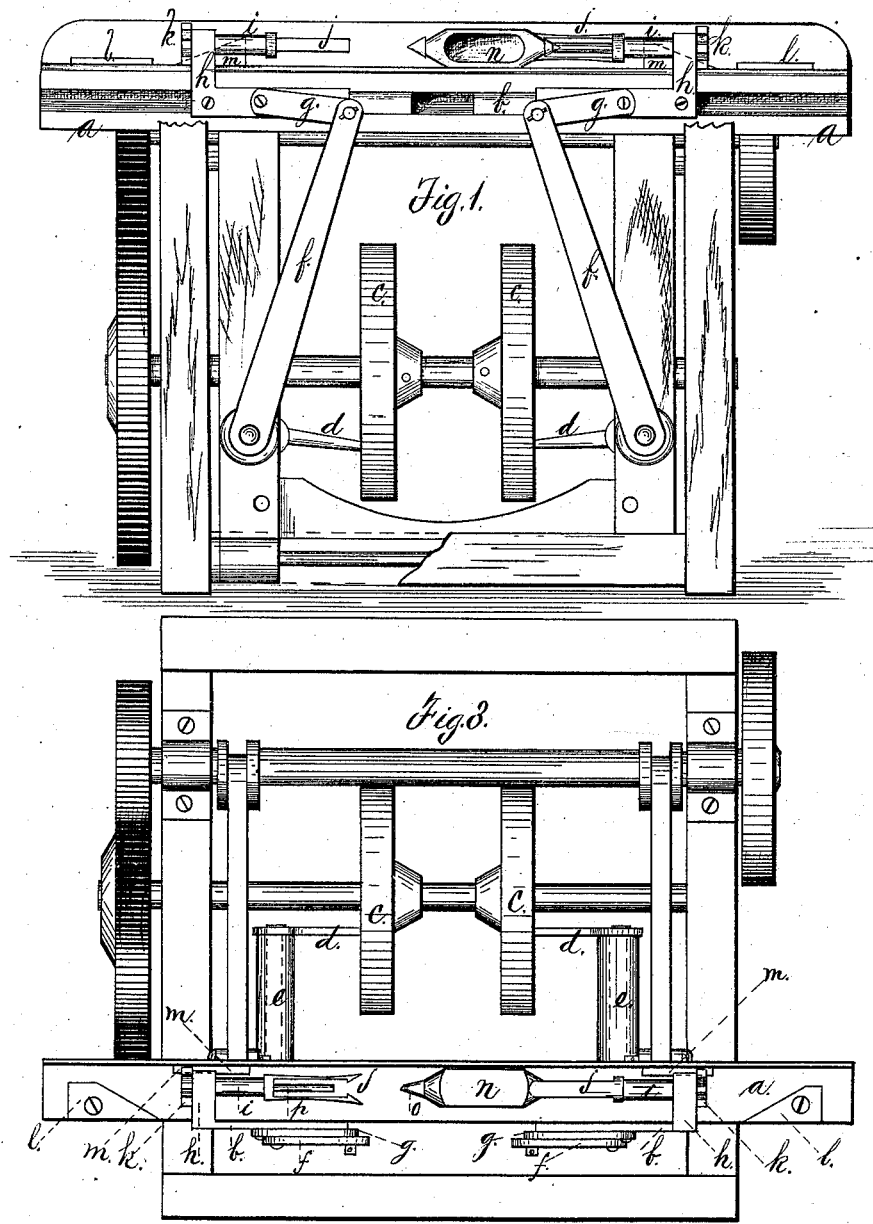

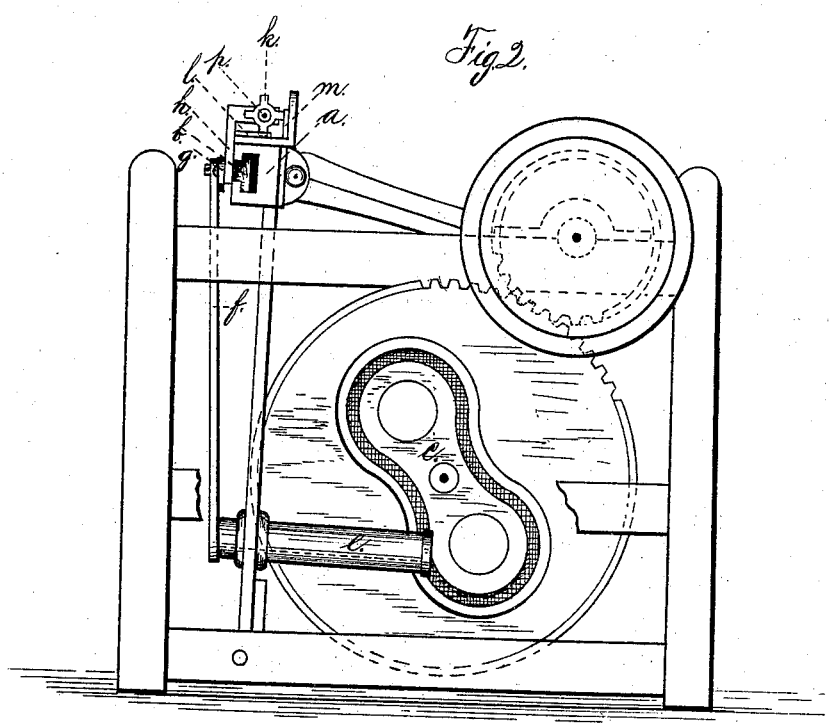

JACOB WIDMER, OF NEW HARTFORD, CONNECTICUT.

IMPROVEMENT IN SHUTTLE-MOTIONS FOR LOOMS.

Specification forming part of Letters Patent No. 203,572, dated May 14, 1878; application filed May 15, 1877.

*To all whom it may concern:*

Be it known that I, JACOB WIDMER, of New Hartford, in the county of Litchfield and State of Connecticut, have invented certain new and useful Improvements pertaining to a Positive Shuttle-Motion for Looms, of which the following is a specification, reference being had to the accompanying drawings, where—

Figure 1 is an elevation of the front of a loom bearing my improvements, with parts of the frame which would interfere with the view represented as removed. Fig. 2 is an elevation of the right of the same, with parts of the frame broken away. Fig. 3 is a top view.

The lathe $a$ is pivoted and vibrates in the common manner. Slides $b$ reciprocate in ways made in the lay, their reciprocation being given from cams $c$ through the medium of crank-fingers $d$, shafts $e$, (having bearings in the lathe-arms,) crank-arms $f$, and connecting-rods $g$. From each of slides $b$ rises a standard, $h$, bearing rotary shaft-rod $i$, furnished at its inner end with barbed fork $j$, and at its outer end with cam-gear $k$, which acts, in conjunction with cam-blocks $l$ $m$, to give the shaft-rod a step-by-step rotation.

The shuttle $n$ is armed on both ends with spear-point $o$, beveled off on upper and under side, so that, when a barbed fork approaches it with its prongs or hooks in a horizontal plane, (meaning as shown in the right-hand fork,) the barbed fork and the spear-point engage, and, for the time being, the shuttle and the shaft-rod bearing such fork are fast together; but when the barbed fork assumes a position in which its prongs are in a vertical plane, (meaning as shown in the barbed fork at the left hand,) the spear-point and such fork disengage.

The views show the shaft-rods just commencing to draw back toward the ends of the lathe. As they continue to retract, and a spur on the cam-gear comes in contact with cam-block $l$, each barbed fork is rotated about one-eighth of a turn by the time the cam-gear has reached the outer limit of its play.

The shaft-rods now advance toward each other, and the cam-gears, being acted on by the cam-blocks $m$, are rotated another one-eighth turn, bringing the right-hand barbed fork to a vertical position or adjustment, so as to disengage from the shuttle, and bringing the left-hand barbed fork to a horizontal position, so as to engage with the said shuttle, so that when the shaft-rods again retract the shuttle goes to the left end of the lathe, and so on indefinitely.

The barbed forks are springs, so as to firmly clasp the spear-point when pushed upon and over it. Between the barbed forks is a push-rod, $p$, with a small socket in the end fitting to the end of the shuttle, so as to propel the shuttle surely and positively.

When a barbed fork disengages from the spear-point it does so just before the opposite barbed fork engages with the opposite spear-point. This is to avoid all danger of clashing of action in engaging and disengaging.

It will be observed by a little study of the cams $c$ that, apart from their general function of imparting vibratory motion to arms $f$, they have the special function of moving in co-operation with the movement of the lathe-arms, so that the movement of arms $f$ is the result of compound movement of cams $c$ and the lathe-arms. Consequently, by face reversal of the cams and a difference of a quarter-turn in their adjustment on the shaft which bears them, the length of the vibratory movement of arms $f$ may be greatly increased.

I claim as my invention—

1. In combination, the spear-pointed shuttle $n$ and the reciprocating and rotary shaft-rods $i$, bearing the barbed forks $j$ and push-rod $p$, the whole arranged to operate substantially as herein shown and described.

2. In combination, the shuttle $n$, the reciprocating shaft-rods $i$, cam-gears $k$, and the cam-blocks $l$ $m$, all arranged to operate substantially as herein shown and described.

3. In combination, the cams $c$, fingers $d$, shafts $e$, the two vibratory crank-arms $f$, borne upon the lathe, the links $g$, slides $h$, shaft-rods $i$, carrying double-pronged forks $j$, mechanism for partially rotating the same, and the spear-pointed shuttle, whereby the said shaft-rods may be moved toward and from each other simultaneously, and the shuttle alternately transferred from one fork to the other.

JACOB WIDMER.

Witnesses:
ORRIN FITCH,
ROBT. R. SMITH.